United States Patent
Wen et al.

(10) Patent No.: US 6,689,460 B2
(45) Date of Patent: Feb. 10, 2004

(54) PRIMER/MEMBRANE BARRIER SYSTEM

(75) Inventors: Jianye Wen, Waltham, MA (US); Frederick M. Drauschke, Melrose, MA (US); Salvador Crespo, Merrimack, NH (US)

(73) Assignee: W. R. Grace & Co.-Conn., Columbia, MD (US)

( * ) Notice: Subject to any disclaimer, the term of this patent is extended or adjusted under 35 U.S.C. 154(b) by 238 days.

(21) Appl. No.: 09/881,400

(22) Filed: Jun. 14, 2001

(65) Prior Publication Data

US 2003/0003314 A1 Jan. 2, 2003

(51) Int. Cl.$^7$ .................................................. B32B 27/30
(52) U.S. Cl. ................................. 428/355 AC; 428/489; 52/309.9; 52/410
(58) Field of Search ......................... 428/489, 755 AC; 52/309.9, 410; 427/389

(56) References Cited

U.S. PATENT DOCUMENTS

| | | | |
|---|---|---|---|
| 2,861,525 A | 11/1958 | Curtis et al. ................. 108/6.5 |
| 4,132,552 A | * 1/1979 | Van Paesschen et al. ... 430/140 |
| 4,176,102 A | 11/1979 | Favata ....................... 260/28.5 |
| 4,597,817 A | 7/1986 | Larsen ....................... 156/280 |
| 4,606,168 A | 8/1986 | Fuhrer ........................ 52/741 |
| 4,646,498 A | 3/1987 | Schneller et al. ............. 52/309 |
| 4,731,399 A | 3/1988 | Fitzgerald et al. ............ 524/60 |
| 4,875,322 A | 10/1989 | Rozzi .......................... 52/746 |
| 4,897,313 A | 1/1990 | Wiercinski .................. 428/489 |
| 5,027,572 A | 7/1991 | Purcell et al. ............. 52/309.9 |
| 5,145,748 A | 9/1992 | Gaidis et al. ............... 428/489 |
| 5,270,373 A | 12/1993 | Wiercinski et al. ......... 524/423 |

OTHER PUBLICATIONS

"Safety Data Sheet", Darex Container Products, Jun. 6, 2001.
"Gypsum Product Catalog", Georgia–Pacific, Jun. 11, 2001 "Dens–Glass Gold".

* cited by examiner

Primary Examiner—Robert Dawson
Assistant Examiner—Christopher M. Keehan
(74) Attorney, Agent, or Firm—Craig K. Leon; William L. Baker

(57) ABSTRACT

An exemplary primer/membrane package system comprises (a) a membrane comprising a carrier sheet and a pressure-sensitive adhesive thereon; and (b) an aqueous dispersion primer composition operative to promote adhesion between a construction surface and the membrane. The primer composition comprises at least two of an acetate, maleate, and acrylate, and has a viscosity of 200–2000 cp and more preferably 400–800 cp (Brookfield/#5 spindle/50 rpm, 25° C).

25 Claims, 1 Drawing Sheet

PRIMER/MEMBRANE BARRIER SYSTEM

FIELD OF THE INVENTION

The present invention relates to barrier systems for protecting surfaces, and more particularly to a water-based primer useful for facilitating bonding of a barrier membrane to substrates such as concrete, gypsum, wood, and fiber board.

BACKGROUND OF THE INVENTION

As organic solvents in the work place have come under increased regulatory scrutiny, it is desired to use water-based compositions when possible. U.S. Pat. No. 4,897,313 of Wiercinski disclosed a waterproofing system for sealing concrete building surfaces, wherein a water-based latex primer composition, comprising butylacrylate, styrene, and acrylonitrile, was disposed upon a concrete surface to facilitate the subsequent attachment thereto of a waterproofing membrane having a pressure-sensitive adhesive on a plastic carrier sheet. An acrylate latex suitable for formulating the primer, available from Union Carbide under the name UCAR Latex 123, could be diluted from its original viscosity of 150 centipoise (cp) to a usable range of 1–100 cp (Brookfeld viscosity at 50 rpm, 25° C.), and more preferably to 5–20 cp, the preferred range for achieving optimum penetration into porous concrete surfaces.

As another example, U.S. Pat. No. 5,270,373 of Wiercinski et al. disclosed a variety of aqueous-based emulsion polymer primers for enhancing the bond of waterproofing membranes to building structure surfaces such as subsurface basements, foundations, concrete walls, retaining walls, and others. Of particular concern was that adhesion of the preformed waterproofing membranes to the concrete surfaces was diminished by the presence of dust particles which covered the cement or concrete walls. Priming (or pretreatment) was required especially in these instances because the ability of the waterproofing membrane to form a bond with the cement or concrete surface was decreased by the particles. Examples of polymers used in the primers included styrene butadiene rubber, styrene butadiene styrene, natural rubber, polybutadiene, polyvinyl acetate, acrylic polymer, chloroprene, polyurethane, copolymers of ethylene and vinyl acetate, or copolymers of vinyl chloride and acrylics (Col. 2, lines 58–65). As a preferred example of a primer composition, Wiercinski et al. taught an SBR emulsion stabilized with potassium oleate.

It is also desired to apply membranes as weather barriers onto gypsum wall boards using water-based primer compositions. However, gypsum wall boards of recent design have glass fibers embedded within a water-resistant gypsum core. Such boards are seen frequently used on new school and office buildings as external support for a "house wrap," such as DuPont's TYVEK® nonwoven fabric, covered subsequently by clapboard sheathing. It has been difficult to substitute the fabric housewrap with a pressure-sensitive adhesive barrier membrane, because it has hitherto been necessary to use solvent-based primers to facilitate bonding of the barrier membrane adhesive to the fiber-embedded gypsum board, and the water-based primers developed for concrete waterproofing use have not been found to facilitate barrier membrane bonding to gypsum boards.

Accordingly, a novel water-based primer system is needed that would permit additional pretreatment applications such as gypsum boards, fiber-embedded gypsum boards, and fiber-containing boards, in addition to cement and concrete structural surfaces.

SUMMARY OF THE INVENTION

In surmounting the disadvantages of the prior art, the present invention provides a barrier membrane package system having a water-based primer operative to enhance bonding of the membrane to difficult surfaces such as gypsum boards, fiber-embedded gypsum boards, fiber boards, as well as to cement, concrete, masonry block, and other surfaces.

An exemplary package system of the invention therefore comprises: (a) a membrane comprising a carrier sheet and a pressure-sensitive adhesive thereon; and (b) a primer composition comprising an aqueous dispersion operative to promote adhesion of said membrane to a construction surface, said primer composition having a viscosity of 200–2000 cp and more preferably 400–600 cp (Brookfield/#5 spindle/50 rpm, 25° C.) and comprising a copolymer having at least two polymers selected from acetate, maleate, and acrylate. The copolymer is preferably an acetate-dioctyl maleate-2-ethylhexyl acrylate. An exemplary method for protecting a construction surface, comprising applying the primer composition to promote adhesion between the surface and the subsequently applied barrier membrane, is also described herein and after.

The term "package" as used herein means and refers both to the situation wherein the barrier membrane and primer are provided together as a system, and also to the situation in which the primer composition and barrier membrane are applied to a construction surface (e.g., a glass-embedded gypsum board) for "packaging" the board itself or as an integrated part of a building structure.

Other advantages and features of the invention may become more apparent in the detailed description that follows.

BRIEF DESCRIPTION OF THE DRAWING

A comprehension of the following detailed description of exemplary embodiments may be facilitated by the accompanying drawing, wherein.

DETAILED DESCRIPTION OF EXEMPLARY EMBODIMENTS

Figure 1:
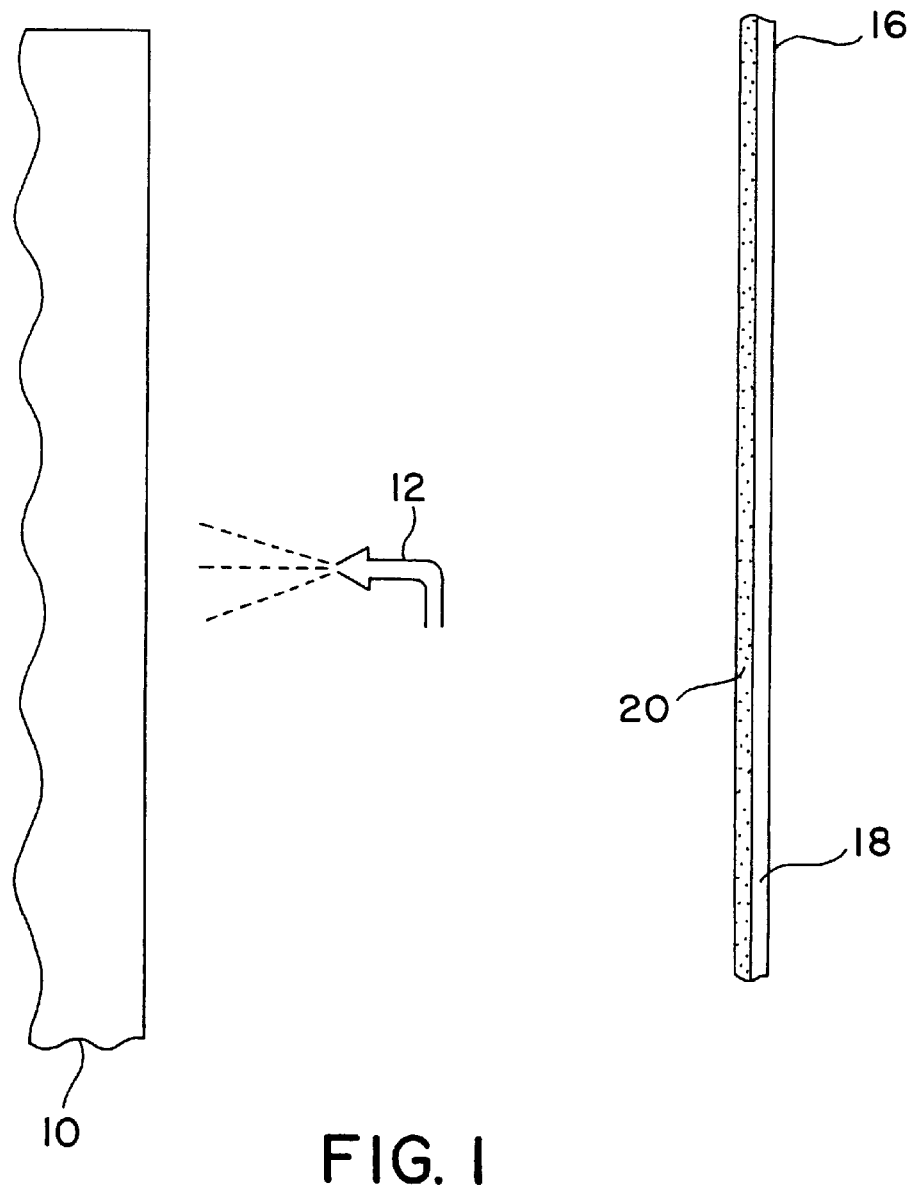
FIG. 1 is an exemplary primer/membrane package system of the invention.

A shown in FIG. 1, an exemplary barrier membrane system package of the invention comprises installing onto a construction surface 10 a barrier membrane 16 using an aqueous dispersion primer composition (designated as at 12). The terms "system" and "package" may be used interchangeably herein and after to refer to the combination of barrier membrane 16 and primer composition 12, either packaged to be sold with one another and/or used in combination as a system (such as at the point of sale) or otherwise used in combination at the application site (such as at a building construction site) for installation on the particular construction surface 10.

Exemplary construction surfaces 10 include cement and concrete, masonry, brick, subsurface foundation walls, decks, roofing, steel, wood panels, tunnels, and pipelines, and also gypsum boards, fiber-embedded gypsum boards, and resin chip board (wood chips bound together by resin, sometimes referred to as "oriented strand board"). Particularly preferred construction surfaces 10 include fiber-embedded boards made of water-resistant gypsum. A fiber-embedded board which is commercially available under the trade name DENS-GLASS GOLD is particularly preferred. This board has glass fibers embedded in a water-resistant core, and contains its own primer, which is believed to be elastomeric in nature, and it is believed the inventors that this primer does not need to be present in order for the primer composition of the present invention to operate effectively in enhancing bonding of the barrier membrane 16 to the board 10.

The present invention also relates to gypsum fiber boards (such as designated at 10 in FIG. 1), optionally having fibers (e.g., glass, polyolefin, polyamide, polyester, cellulose, etc.) embedded therein, optionally containing adhesive materials (e.g., urea-formaldehyde resins, wax asphalt, polyvinyl alcohol, thermoplastic resins), and/or optionally pre-coated (prior to shipment/installation at construction site) with elastomeric protective coating(s) (e.g., acrylates, wax, asphalt, natural or synthetic latexes, etc.), in combination with the aqueous primer composition 12 and (weather) barrier membrane 16 described above. Such boards are generally known in the industry (See e.g., U.S. Pat. No. 5,883,024; U.S. Pat. No. 5,718,785; U.S. Pat. No. 5,791,109; U.S. Pat. No. 5,704,179; U.S. Pat. No. 5,644,880; U.S. Pat. No. 5,371,989; U.S. Pat. No. 5,342,680; U.S. Pat. No. 5,319,900; U.S. Pat. No. 5,220,762; U.S. Pat. No. 5,148,645; U.S. Pat. N 5,135,805; U.S. Pat. No. U.S. Pat. No. 4,879,173; U.S. Pat. No. 4,810,569; and U.S. Pat. No. 4,647,496).

Exemplary barrier membranes 16 may comprise a polymer carrier sheet 18 and preformed, pressure-sensitive adhesive 16 layer such as a rubber-modified bituminous adhesive, synthetic adhesive, or other conventional pressure-sensitive adhesives. A suitable barrier membrane is taught in U.S. Pat. No. 5,027,572 of Purcell and Shapiro, incorporated fully by reference herein. This patent disclosed a two-part membrane of multiple cross-laminated layers of polyethylene film, fully bonded to a layer of rubberized asphalt. Such a membrane is sold commercially under the trademark PERM-A-BARRIER by Grace Construction Products (a business of W. R>Grace & Co.-Conn.), Cambridge, Mass., USA. This membrane is typically used in exterior insulation finish systems to cover gypsum board. Other barrier membrane materials may also be suitably employed in the invention. Instead of a polymer film, the membrane may also employ a fabric (e.g., nonwoven), mesh, or felt as the carrier support sheet 18. Exemplary carrier sheets 18 are preferably cross-laminated, high density polyethylene film (2–10 mils thick) with rubberized bitumen (asphalt) (20–40 mils thick).

Exemplary aqueous primer compositions 12 of the invention may be spray applied (as shown in FIG. 1), brushed, or rolled onto the construction surface 10, or otherwise applied by known means. Preferably, the primer compositions have a viscosity of 200–2000 centipoise (cp), Brookfield/#5 spindle/50 rpm, 25° C., and more preferably 400–800 cp, and are preferably applied in a wet thickness of 1–30 mils.

Exemplary aqueous dispersion primer compositions comprises a copolymer of a vinyl acetate, a maleate, and an acrylate; and most preferably they comprise vinyl acetate-dioctyl maleate-2-ethylhexyl acrylate. Preferably, the primer composition comprises a copolymer having an average particle size of 0.5–1.5 microns, and more preferably an average particle size of about 1 micron.

Exemplary acetates for use in the primer composition may include vinyl acetate.

Exemplary maleates for use in the primer composition may include di-ethyl maleate, di-2-ethyl hexyl maleate, di-butyl maleate, octyl acid maleate, or mixtures thereof.

Exemplary acrylates for use in the primer composition may include ethyl acrylate, methyl methacrylate, methyl acrylate, butyl acrylate, 2-ethylhexyl acrylate, or mixtures thereof.

Exemplary primer compositions further comprise one or more surfactants. Anionic surfactants that may be used include polyalkoxycarboxylates, alkylbenzenesulfonates, petroleum sulfonates, fatty acid ester sulfonates, sulfates, or mixtures thereof. Nonionic surfactants that may be used include polyoxyethylene, carboxylic acid esters, and glycol esters of fatty acids. Cationic surfactants that be be used include amines, quaternary ammonium salts, or mixtures thereof. Particularly preferred surfactants include disodium dodecyl benzene sulfonate (preferably in solution form), sodium salt (preferably water soluble form), phosphate ester etherified alkyl phenol, alkyl aryl polyether glycol, sodium salt of alkyl aryl polyether sulfate, sodium vinyl sulfonate, sodium lauryl sulfate nonylphenoxypoly ethanol, or mixtures thereof.

In preferred embodiments of the invention, the primer compositions further comprise at least one rheology modifier, such as animal glue, carboxymethyl cellulose, casein, cellulose ether, gelatin, guar gum, gum arabic, polyvinyl alcohol, soap, sodium polyacrylate, hydroxyethyl cellulose, or mixture thereof.

In primer/membrane packaging systems of the invention which are installed on vertical services, it is preferred that the primer composition include a tackifying plasticizer or "tackifying resin" to facilitate pressure-sensitive adhesion of the barrier membrane 16 further. Such tackifiers generally have average molecular weights in the 500–2000 range, with broad molecular weight distribution. Exmplary tackifier plasticizers or tackifying resins include dipropylene/diethylene glycol dibenzoate, dipropylene glycol dibenzoate, butyl benzyl phthalate, citric acid esters, dibutoxyethyl phthalate, dibutyl phthalate, dicyclohexyl phthalate, diisobutyl adipate, diisodecyl adipate, diisooctyl phthalate, dimethyl phthalate, dioctyl adipate, dioctyl phthalate, diphenyl phthalate, glycerine, propylene glycol, sodium nitrate, tricresyl phosphate, butyl phthalyl ethyl glycolate, hydrocarbon resin (e.g., rosin derivatives, terpene resins), rosin derivatives, low molecular weight acrylics, coumarone-indene resins, terpene oligomers, aliphatic petroleum resins, alkyl-modified phenolics, or mixtures thereof. Tackifying plasticizers to be generally suitable for use in the invention are available under a variety of tradenames, such as BAKELITE™ (Union Carbide); HERCOLYN™ (Hercules, Inc.); NEVILLAC™ (Neville Chemical Co.); PICCOFLEX™ PICCOLITE™ and PICCOPALE™ (Union Carbide); and VINSOL™ (Hercules, Inc.). Accordingly, in primer/membrane package systems for vertical installation, it is preferred that a plasticizing tackifier or tackifier resin be incorporated into the surfactant.

Still further exemplary primer/membrane packaging systems of the invention further comprise an agent for lowering the freezing point of the primer composition. Preferred agents include alcohol (e.g., methanol, ethanol, propylene glycol, ethylene glycol, etc.), sodium chloride, urea, sucrose, potassium acetate, seawater, or mixture thereof.

In particularly preferred primer/membrane package systems of the invention, the membrane comprises a polymer film (e.g., cross-laminated polyethylene) and a pressure-sensitive adhesive layer comprising a rubberized asphalt; and the aqueous dispersion primer composition comprises a copolymer having at least two of the acetate, maleate, and acrylate (in a ratio of 10:90 to 90:10); and more preferably all three of the acetate, maleate, and acrylate. Preferably, the acetate (e.g., vinyl acetate) is present in the amount of 30–50%; the maleate (e.g., dibutyl or dioctyl maleate) is present in the amount of 30–50%; and the acrylate (e.g., 2-ethylhexyl acrylate) is present in the amount of 10–30%;

all percentages based on total weight solids in the composition. Particularly preferred primer compositions comprise one or more surfactants present in the amount of 0.5–5%, a rheology modifying agent present in the amount of 0.05 and preferably a plasticizing tackifier (or tackifier resin) in the amount of 0.5–5%, all percentages based on total weight of solids in the composition.

Other exemplary percentage ranges for the primer compositions can be as follows: vinyl acetate in the amount of 20–60%; maleate in the amount of 20–60%, and acrylate in the amount of 5–40%; surfactant in the amount of 0.05–5%; rheology modifying agent in the amount of 0.05–5%; tackifying plasticizer (or tackifying resin) in the amount of 0.5–10%; all percentages based on total weight of said primer composition. These are merely exemplary ranges. Those skilled in the art can alter these ranges, depending on the specific nature of the components chosen and their compatability and/or interaction with each other, according to the situation, without departing from the spirit of the invention.

The invention also pertains to construction surface package or systems (as shown in FIG. 1) comprising a construction surface 10 upon which said primer composition 12 is disposed as a coating layer facilitating bonding between said construction surface 10 and said barrier membrane 16. Accordingly, the construction surface 10 may comprise cement, concrete, masonry block, brick, subsurface foundation walls, decks, roofing, steel, wood panels, tunnels, pipes, gypsum board, fiber-embedded gypsum board, resin chip board, or mixture thereof. Preferably, the construction surface 10 is fiber-embedded gypsum board; and most preferably, the board 10 is mounted upon framework as an integral part of a building structure.

The present invention also pertains to methods for packaging construction surfaces 10, comprising: applying the primer composition 12 to a construction surface 10 and subsequently applying thereupon the barrier membrane 16, which preferably comprises a carrier sheet 18 upon which is continuously disposed a pressure-sensitive adhesive layer 20 (e.g., rubberized bitumen or asphalt, synthetic adhesive). As mentioned above, the primer compositions 12 of the invention are most suited for providing pretreatment to fiber-embedded gypsum boards, which are increasingly being used in so-called external insulation finish systems of the type described in U.S. Pat. No. 5,027,572. In preferred methods of the invention, the fiber-embedded gypsum board is installed on framing, and the primer composition 12 is then applied to facilitate adhesion of the barrier membrane 16 over the board 10 which is integrated as part of the building structure. Fiber-embedded gypsum boards are commercially available with or without coatings, and in either case the preferred copolymers in exemplary primer compositions of the invention should preferably comprise at least two of acetate, maleate, or acrylate, and preferably all three (e.g., vinyl acetate-dioctyl maleate-2-ethylhexyl acrylate) as previously described above.

The following examples are provided for illustrative purposes only and are not intended to limit scope of the invention.

EXAMPLE 1

Six polymer emulsions were tested for their ability to facilitate the adhesion of a barrier membrane to a glass fiber-embedded gypsum core board. The test membrane used was GRACE PERM-A-BARRIER brand membrane comprising 36 mils thickness of self-adhesive rubberized asphalt integrally bonded to 4 mils thickness of cross-laminated, high density polyethylene film. The test membranes were three (3) inch wide strips. The fiber/gypsum board was DENS-GLAS GOLD which had glass fibers embedded in a water-resistant treated gypsum core.

Sample #1 was an exemplary aqueous primer composition of the present invention which may be prepared by polymerizing together two or more of an acetate (e.g., vinyl acetate), maleate (e.g., dioctyl maleate); or acrylate (e.g., ethylhexyl acrylate). The copolymerization process may be done either in batchwise or continuous fashion by heating the acetate, maleate, and/or acrylate monomers between 140–180° F. for about 4–16 hours. An aqueous dispersion comprising a vinyl acetate-dioctyl maleate-2-ethylhexyl acrylate (appr. 38–52%), water (appr. 40–60%), vinyl acetate (monomer less than 1% present), and remainder comprising surfactant, rheology modifying agent, and/or tackifier (1–10%) is commercially available from Grace Performance Chemicals, Cambridge, Mass., under the tradename DARATAK®. In particular, DARATAK® 90L provided the best peel strength in testing results, although it is believed that individual test results may depend upon the construction surface used. DARATAK® 90L emulsions, in particular, were designed for adhering plastic film to paper, and thus it is believed by the present inventors that even better peel adhesion strength may be achieved for the barrier membrane applications of the present invention by using other surfactant/rheology modifying agents, and/or tackifying plasticizers or tackifying resins as described previously above. Viscosity of primer compositions may be adjusted by addition of water to achieve an ideal viscosity in the range of 200–2000 and more preferably 400–800 cp.

For comparitive purposes, primer composition samples #2-#5 were conventional primers available in the industry. Sample #2 was an acrylic emulsion (NEOCAR 820, Union Carbide). Sample #3 was a vinylidene chloride acrylate copolymer emulsion (HALOFLEX 320 from Neoresins). Sample #4 was another acrylic copolymer emulsion (NEOCRYL A7129 from NeoResins). Sample #5 was a butyl rubber emulsion (AQUALAST BL-100 from Lord Corp.). Sample #6 was a butylacrylate emulsion, available under the tradename SYSTEM 4000 from Grace Construction Products, Cambridge, Mass. Each of the sample primer compositions were applied in equal thickness (about 1–30 mils wet thickness) onto the gypsum core surface, and the three-inch wide membrane strips were applied onto the pretreated DENS GLASS GOLD substrate. The peel strength of the membrane sample strips were tested on an Instron machine pulling at a 90 degree angle at a rate of 2 in./min. The results are set forth in Table 1 below. Viscosity was determined by Brookfield RV, #5 spindle, 50 rpm, 25° C. Sample 1 had surprisingly superior peel strength. It is believed that similar results can be obtained with a variety of construction surfaces.

TABLE 1

| Sample | PRIMER | Viscosity (cp) | Peel Strength (Pounds per inch) |
| --- | --- | --- | --- |
| 1 | Acetate/Maleate/Acrylate | 512 | 5.9 |
| 2 | Acrylic Emulsion | 100 | 1.4 |
| 3 | Vinylidene Chloride Acrylate | 60 | 1.7 |
| 4 | Acrylic Emulsion | 1 | 0.6 |
| 5 | Butyl Rubber Emulsion | <200 | 1.5 |
| 6 | Butyl Acrylate Emulsion | 1 | 1.6 |

EXAMPLE 2

A slow peel test was performed using barrier membrane strips which comprised a polyethylene carrier film supporting a rubber asphalt pressure-sensitive adhesive. The strips were approximately one foot wide by three feet in length. The construction surface was a glass-fiber embedded gypsum board that is commercially available under the tradename DENS-GLASS GOLD.

A first sample strip membrane was applied onto a board using no primer. A second sample strip membrane was applied to the board using a solvent-based primer (Primer B2 from Grace Construction Products). A third sample was a water-based butyl acrylate sold as SYSTEM 4000 pretreatment conditioner also from Grace. A fourth sample was an exemplary aqueous primer composition of the invention comprising a copolymer of acetate, maleate, and acrylate (sold under the tradename DARATAK from Grace). Each of the four sample strips, which had a two-inch overhang at the top, were installed onto the gypsum boards outdoors. After four weeks, only the fourth sample strip membrane stayed adhered to the gypsum board; all the others fell off completely.

The foregoing examples are provided by way of illustration only and are not intended to limit the scope of the invention.

It is claimed:

1. A package including a barrier membrane and primer composition, comprising: (a) a barrier membrane comprising a carrier sheet and a pressure-sensitive adhesive layer attached thereon, said barrier membrane operative to waterproof a construction surface to which it is adhered; and (b) a primer composition comprising an aqueous dispersion operative to promote adhesion of said membrane to a construction surface, said primer composition having a viscosity of 200–2000 cp (Brookfield/#5 spindle/50 rpm, 25° C.) and comprising a copolymer having at least two polymers selected from the group consisting of acetate, maleate, and acrylate.

2. The package of claim 1 wherein said viscosity is 400–800 cp.

3. The package of claim 1 wherein said aqueous dispersion primer composition comprises a copolymer of a vinyl acetate, a maleate, and an acrylate.

4. The package of claim 1 wherein said primer co position comprises a copolymer of vinyl acetate-dioctyl maleate-ethylhexyl acrylate.

5. The package of claim 1 wherein said primer co position comprises an aqueous dispersion of vinyl acetate-dioctyl maleate-2-ethylhexyl acrylate.

6. The package of claim 1 wherein said acetate comprises a vinyl acetate.

7. The package of claim 1 wherein said maleate comprises di-ethyl maleate, di-2-ethyl hexyl maleate, di-butyl maleate, octyl acid maleate, or mixture thereof.

8. The package of claim 1 wherein said acrylate comprises ethyl acrylate, methyl methacrylate, methyl acrylate, butyl acrylate, 2 ethyl hexyl acrylate or mixture thereof.

9. The package of claim 1 wherein s id aqueous dispersion primer composition further comprises a surfactant comprising disodium dodecyl benzene sulfonate, sodium salt, phosphate ester etherated alkyl phenol, alkyl aryl polyether glycol, sodium salt of alkyl aryl polyether sulfate, sodium vinyl sulfonate, odium lauryl sulfate nonylphenoxypoly ethanol, or mixture thereof.

10. The package of claim 9 wherein said aqueous dispersion primer composition further comprises a rheology modifier comprising an animal glue, carboxymethyl cellulose, casein, cellulose ether, gelatin, guar gum, gum arabic, polyvinyl alcohol, soap, sodium polyacrylate, hydroxyethyl cellulose, or mixture thereof.

11. The package of claim 1 wherein said aqueous dispersion primer composition further comprises a tackifying plasticizer selected from dipropylene/diethylene glycol dibenzoate, dipropylene glycol dibenzoate, butyl benzyl phthalate, citric acid esters, dibutoxyethyl phthalate, dibutyl phthalate, dicyclohexyl phthalate, diisobutyl adipate, diisodecyl adipate, diisooctyl phthalate, dimethyl phthalate, dioctyl adipate, dioctyl phthalate, diphenyl phthalate, glycerine, propylene glycol, sodium nitrate, tricresyl phosphate, butyl phthalyl ethyl glycolate, hydrocarbon resins, or a mixture thereof.

12. The package of claim 3 further comprising a surfactant and plasticizing tackifier.

13. The package of claim 1 wherein said aqueous dispersion primer composition further comprises an agent for lowering the freezing point, sa d agent comprising an alcohol, sodium chloride, urea, sucrose, potassium acetate, seawater, or mixture thereof.

14. The package of claim 1 further comprising an alcohol freezing point lowering agent comprising methanol, ethanol, propylene glycol, ethylene glycol, or mixture thereof.

15. The package of claim 1 wherein said membrane comprises a polymer film and a pressure-sensitive adhesive layer comprising a rubberized asphalt.

16. The package of claim 1 wherein said membrane comprises a polyethylene polymer film and a pressure-sensitive rubberized asphalt adhesive layer, and wherein said primer composition comprises an aqueous dispersion o vinyl acetate-dioctyl maleate-2-ethylhexyl acrylate.

17. The package of claim 3 wherein said copolymer of said primer composition comprises a vinyl acetate in the amount of 20–60%, a maleate in the amount of 20–60%, and an acrylate in the amount of 5–40%, a surfactant in the amount of 0.05–5%, and a tackifying plasticizer in the amount of 0.5–10%, all percentages based o total weight of said primer composition.

18. The package of claim 1 further comprising a construction surface upon which said primer composition is disposed as a coating layer facilitating bonding between said barrier membrane and said construction surface.

19. The package of claim 1 wherein said construction surface comprises cement, concrete, masonry block, brick, subsurface foundation walls, decks, roofing, steel, wood panels, tunnels, pipes, gypsum board, fiber-embedded gypsum board, resin chip board, or mixture thereof.

20. The package of claim 1 wherein said construction surface comprises fiber-embedded gypsum board.

21. The package of claim 1 wherein said primer co position comprises a copolymer having an average particle size of 1 micron.

22. Method for protecting a construction surface, comprising: applying said primer composition of claim 1 to a construction surface, and subsequently applying thereupon said barrier membrane of claim 1.

23. Method of claim 22 wherein said construction surface is a fiber-embedded gypsum board.

24. Method of claim 23 wherein said fiber-embedded gypsum board is installed on framing.

25. The method of claim 22 wherein said primer composition comprises an aqueous dispersion of a vinyl acetate-dioctyl maleate-ethylhexyl acrylate.

* * * * *

UNITED STATES PATENT AND TRADEMARK OFFICE
CERTIFICATE OF CORRECTION

PATENT NO. : 6,689,460 B2
DATED : February 10, 2004
INVENTOR(S) : Wen et al.

It is certified that error appears in the above-identified patent and that said Letters Patent is hereby corrected as shown below:

Column 3,
Line 2, "believed" should read -- believed by --

Column 4,
Line 28, "Exmplary" should read -- Exemplary --

Column 7,
Line 59, "s id" should read -- said --
Line 64, "odium" should read -- sodium --

Column 8,
Line 20 "sa d" should read -- said --
Line 32, "o" should read -- of --
Line 39, "o" should read -- on --
Line 52, "co position" should read -- composition --

Signed and Sealed this

Sixth Day of July, 2004

JON W. DUDAS
*Acting Director of the United States Patent and Trademark Office*